United States Patent [19]

Parchet et al.

[11] Patent Number: 4,562,632

[45] Date of Patent: Jan. 7, 1986

[54] DEVICE FOR MOUNTING OPTICAL FIBERS WITHIN A TERMINAL

[75] Inventors: Pierre Parchet, Paris; Dominique Bertho, Sartrouville, both of France

[73] Assignee: Socapex, Suresnes, France

[21] Appl. No.: 539,961

[22] Filed: Oct. 7, 1983

[30] Foreign Application Priority Data

Oct. 8, 1982 [FR] France ................................ 82 16905

[51] Int. Cl.⁴ ............................................. B25B 27/14
[52] U.S. Cl. .................................. 29/281.1; 269/902; 269/903; 350/96.21
[58] Field of Search ................. 269/43, 902, 903, 909; 156/158; 350/96.2, 96.21, 96.22; 29/760

[56] References Cited

U.S. PATENT DOCUMENTS

| 3,864,018 | 2/1975 | Miller ............................... 350/96.21 |
| 4,019,241 | 4/1977 | Logan . |
| 4,030,809 | 6/1977 | Onishi et al. . |
| 4,132,461 | 1/1979 | Jacques et al. . |
| 4,160,580 | 7/1979 | Le Noane et al. ................ 350/96.21 |
| 4,179,186 | 12/1979 | Tynes .............................. 156/158 X |
| 4,296,997 | 10/1981 | Malsot et al. ................. 350/96.21 X |

FOREIGN PATENT DOCUMENTS

| 0001117 | 9/1978 | European Pat. Off. . |
| 2417784 | 2/1978 | France . |
| 2408152 | 10/1978 | France . |
| 2487528 | 1/1982 | France . |

OTHER PUBLICATIONS

Comerford et al., "Optical Fiber Coupler", *IBM Technical Disclosure Bulletin,* vol. 22, No. 7, Dec. 1979, pp. 2933-2934.

*Primary Examiner*—Frederick R. Schmidt
*Assistant Examiner*—Steven P. Schad
*Attorney, Agent, or Firm*—Oblon, Fisher, Spivak, McClelland & Maier

[57] ABSTRACT

The device for mounting optical fibers within an attachment terminal comprises a base having a terminal-positioning V-groove for placing a terminal in a reference position and a V-groove for positioning the optical fibers. A calibrated spacer member is placed at the bottom of the fiber-positioning groove, a bearing member having a V-shaped cross-section being placed above the spacer member in order to maintain the optical fibers in position. The calibrated spacer member defines a first and a second lateral V-groove, one optical fiber being placed within each lateral V-groove. The bearing member comes into mechanical contact with the sides of the fiber-positioning groove and with the optical fibers but does not come into contact with the calibrated spacer member.

23 Claims, 10 Drawing Figures

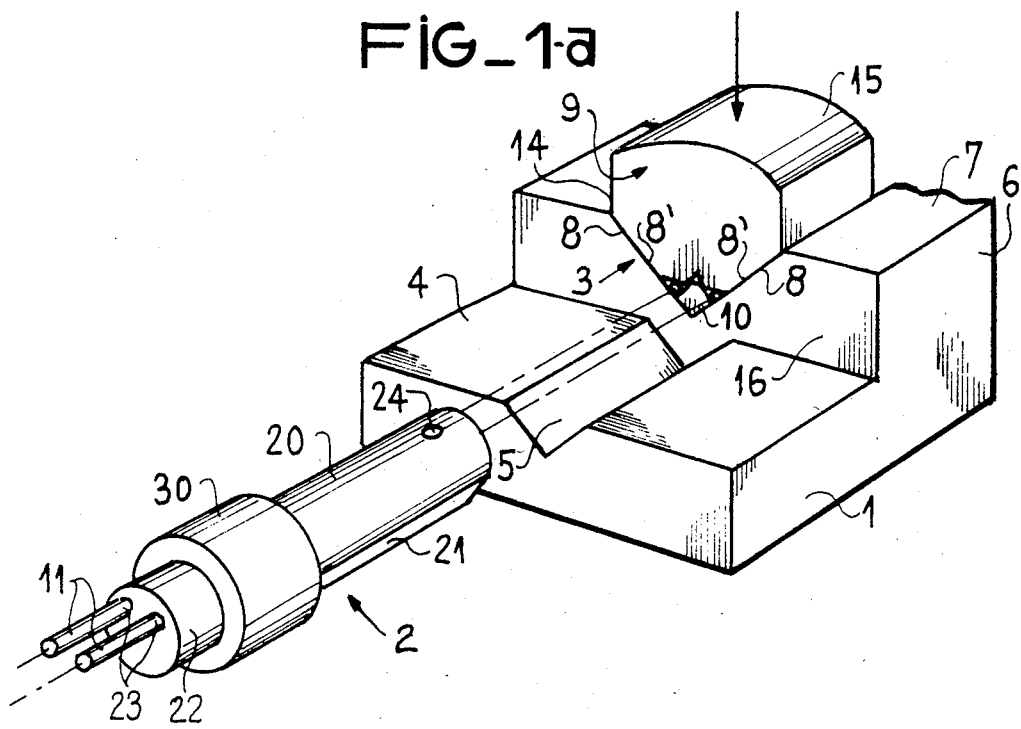
FIG_1-a
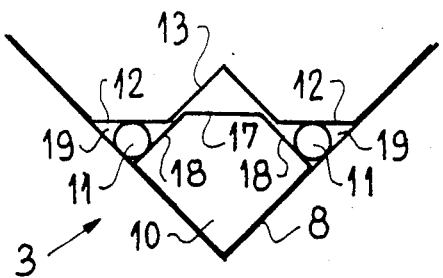
FIG_1-b
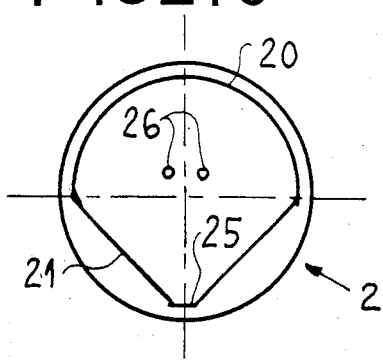
FIG_1-c
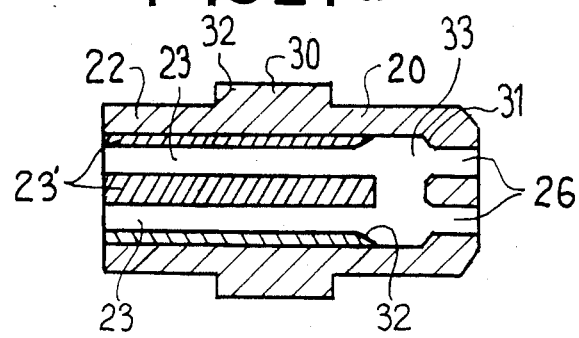
FIG_1-d

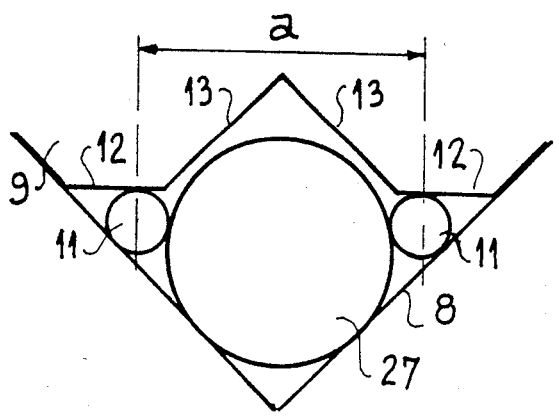
FIG_2·a
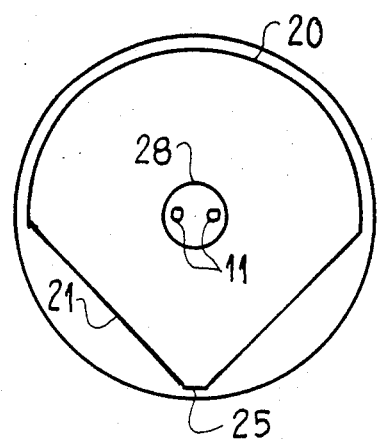
FIG_2·b
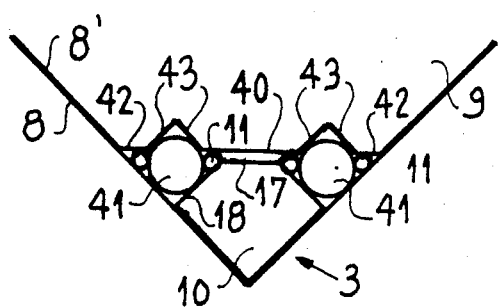
FIG_3·a
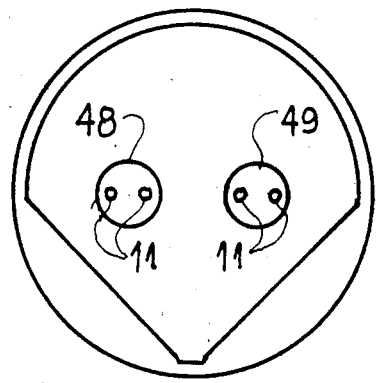
FIG_3·b

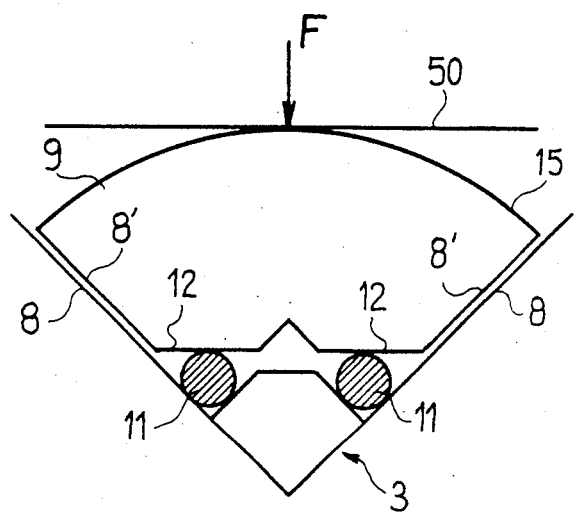
FIG_4
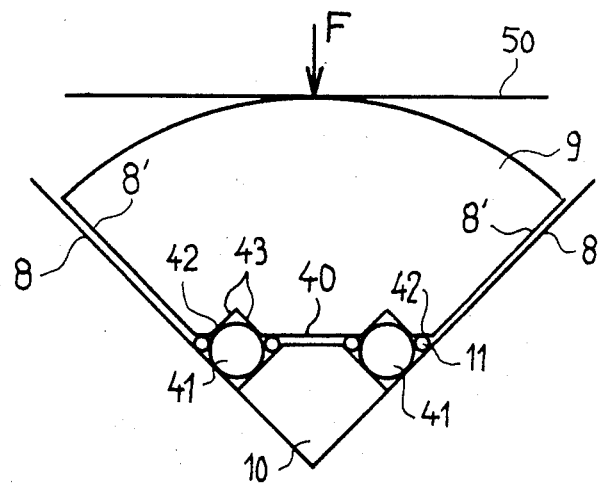
FIG_5

DEVICE FOR MOUNTING OPTICAL FIBERS WITHIN A TERMINAL

BACKGROUND OF THE INVENTION

This invention relates to a device for mounting optical fibers within an attachment terminal.

A known device for mounting optical fibers within an attachment terminal has already been described in French Pat. No 2,487,528. This device has a V-shaped groove which is defined by standard packing-blocks and in which calibrated cylindrical rods are aligned along the flanks of the V-groove, the rods being maintained in position by application of a suitable system of forces. Alignment of the fibers of the terminal is then carried out by placing each fiber between two calibrated cylindrical rods which are held in position by a plug which has a V-shaped profile and comes into contact with the optical fibers.

It is a difficult matter, however, to achieve satisfactory application of a system of forces on all the calibrated cylindrical rods. In consequence, the forces exerted on the optical fibers placed between the calibrated cylindrical rods and produced by the action of the plug which positions them within these latter cannot readily be controlled, particularly by reason of the fact that they are highly dependent on the positions of the cylindrical rods. As a result, some fibers may be compressed to an excessive degree, which is liable to impair accuracy of positioning of the fibers.

SUMMARY OF THE INVENTION

The aim of the present invention is to provide a device which serves to mount optical fibers within an attachment terminal, which is of more simple constructional design than the device of the prior art, and in which the forces exerted on the optical fibers can be controlled with accuracy.

The invention therefore relates to a device for mounting optical fibers in a terminal in which provision is made for a base comprising means for placing said terminal in a reference position and a first V-shaped groove for positioning said optical fibers as well as a bearing member which has a V-shaped cross-section and is intended to maintain the optical fibers in position. The device is distinguished by the fact that it comprises a calibrated spacer member placed at the bottom of said first V-groove and so designed as to define a first and a second V-shaped profile, each profile being capable of receiving at least one optical fiber. In accordance with another distinctive feature, the bearing member is liable to come into mechanical contact with the optical fibers without, however, being in contact with said calibrated spacer member, thereby ensuring that any possible deformation of the optical fibers is sufficiently small to permit the desired accuracy of positioning of the fibers within the terminal.

The aforementioned calibrated spacer member can have a square cross-section and can be provided with a chamfered top edge located opposite to the bottom of the V-groove.

The calibrated spacer member aforesaid can be a cylindrical precision rod.

In an alternative embodiment for mounting four optical fibers, the first and the second V-shaped profiles receive respectively a second and a third calibrated spacer member in order to define a group of four secondary V-shaped profiles, each of which can receive one optical fiber. At least one of said second and third calibrated spacer members can be a cylindrical precision rod.

In a preferred embodiment, the bearing member has extensions which correspond in each case to at least one optical fiber in order to position said fiber. In the alternative embodiment of the device which is designed for mounting four optical fibers, the bearing member can be provided with a central extension corresponding to two optical fibers placed in two central secondary profiles, and with two lateral extensions each corresponding to one optical fiber placed in a lateral secondary profile.

In an alternative embodiment, at least one extension has the shape of a triangle, the truncated apex of which is located at the level of at least one optical fiber.

In another alternative embodiment, the device in accordance with the invention is such that the optical fibers are positioned in the same plane.

In a manner known per se, the means for placing the fiber attachment terminal in a reference position can be a second V-shaped groove, the axis of which is displaced with respect to the axis of the first V-shaped groove.

The bearing member can be adapted to come into mechanical contact with the sides of the first V-shaped groove and subject the optical fibers to a degree of compression which is preferably lower than or equal to a few microns.

In an alternative embodiment, the bearing member is adapted to come into mechanical contact with the optical fibers without being in contact with the sides of the first V-groove and a suitable device applies a calibrated force on the fibers. In this case, the bearing member can be produced with a lower degree of precision.

The invention further relates to a fiber-positioning terminal for a minimum of two and a maximum of four optical fibers, the terminal being essentially provided on its rear face with a number of openings equal to the number of optical fibers which it is intended to carry, said openings being so arranged as to extend to a single reservoir for an adhesive, the number of openings provided on the front face of said terminal being at least equal to one-half the number of optical fibers.

BRIEF DESCRIPTION OF THE DRAWINGS

FIG. 1a, is a view in perspective illustrating one embodiment of a device in accordance with the invention.

FIG. 1b is a front view showing a detail of FIG. 1a.

FIG. 1c is a front view showing the fiber attachment terminal of FIG. 1a.

FIG. 1d is a sectional view taken in the plane of the fibers and showing the terminal of FIG. 1a.

FIGS. 2a and 2b illustrate a variant of the preceding figure, which is more particularly adapted to a terminal having a single bore for the passage of two fibers.

FIGS. 3a and 3b illustrate an embodiment of the invention which is adapted to the positioning of four optical fibers.

FIGS. 4 and 5 illustrate variants of FIGS. 1b and 3a respectively.

DESCRIPTION OF THE PREFERRED EMBODIMENTS

In FIG. 1a, a base 1 has a lower flat face 4 and a V-shaped groove 5 formed in said face, said groove being capable of receiving a corresponding contour 21 formed in a front cylindrical portion 20 of a fiber attachment terminal 2. The invention applies in a general manner to any fiber terminal which can be subjected to accurate angular orientation such as, for example, a cylindrical terminal provided with an angular positioning groove The terminal 2 is provided at the rear end 22 with two openings 23, each opening being adapted to receive an optical fiber 11 and a central annular collar 30 for mounting said terminal within a terminal body (not shown in the drawings). The base 1 also has an upper face 7 which is located at a higher level than the lower flat face 4 and joined to this latter by a vertical face 16 forming an abutment. There is formed in the upper flat face 7 a V-shaped groove 3, the walls of which are designated by the reference numeral 8. At the bottom of the groove 3, there is placed a calibrated spacer member 10 having a square cross-section. Said calibrated spacer member defines on each side a V-shaped profile 19, one wall of which is constituted by a wall 8 of the groove 3 and the other wall of which is constituted by one of the sides 18 of the calibrated spacer member 10. A bearing member 9 has a top wall 15 and two parallel lateral faces 14 having downward extensions in the form of two inclined planes 8' so arranged as to correspond to the profile of the groove 3. The inclined planes 8' do not extend to the bottom of the V-groove 3 but only to a horizontal face 12 in which is formed a central groove 13 parallel to the axis of the groove 3.

As can more readily be seen in FIG. 1b, an optical fiber 11 is placed within the first and the second V-shaped profiles 19 defined by the calibrated spacer member 10 and the V-groove 3, the faces 8 of which can be at right angles to each other. When the bearing member 9 is in position within the groove 3, each of the two portions of the horizontal face 12 comes into contact with the corresponding optical fiber 11. The groove 13 is so arranged that the bearing member 9 is not in contact with the calibrated spacer member 10. In order to facilitate this absence of contact, the calibrated spacer member 10 has a chamfered top edge 17 located opposite to the bottom of the V-groove 3, the bearing member 9 being provided with the longitudinal groove 13 at the center of its bottom face 12. Under these conditions, since the bearing member 9 is abuttingly applied against the walls 8 of the V-groove 3, the position of the horizontal bottom face 12 is determined with precision. Taking into account the geometrical dimensions of the spacer member 10, this permits precise determination of the compressive stress to which the optical fibers 11 are subjected in order to position these latter by applying them against the bottom of the secondary V-grooves. In practice, compression of the fibers will be limited to a maximum value of only a few microns in order to ensure that the stresses thus exerted are not liable to result in deformation of the fibers and impaired accuracy of centering.

By way of alternative, the horizontal bottom face 12 is such that a clearance of less than about three microns exists between this latter and the fibers which are in this case simply guided and not forcibly applied in position.

FIG. 1c is a front view of the fiber attachment terminal 2. The faces 21 of the V-shaped contour meet at a junction face 25. The optical fibers 11 are introduced through openings 23 which are equal in number to the optical fibers of the terminal (namely two fibers in the case considered in this example), said fibers being located within the rear cylindrical portion 22 of the terminal. The optical fibers emerge from the front face at the level of two openings 26 which, when the terminal is positioned within the groove 5 and abuttingly applied against the vertical face 16, are located respectively opposite to the first and second V-shaped profiles 19. As shown in the figure, the openings 26 are preferably located in the mid-plane of the terminal.

Positioning of the optical fibers within the terminal is accordingly performed in the manner which will now be explained with reference to FIG. 1d. The optical fibers 11 are introduced within the openings 23 which are formed in an added member 23' of the terminal 2 and are slightly larger in diameter than the optical fibers, on the one hand in order to enable the fibers to slide freely and on the other hand in order to carry out axial pre-guidance of the fibers through the openings 23. The fibers 11 then pass through a chamber 33 which communicates with the exterior of the terminal via an opening 24 (as shown in FIG. 1a). The chamber 33 is flared-out at 32 from the openings 23 and performs the function of a reserve of adhesive. The fibers then pass into the opening or openings 26, the diameter of which is also larger than that of the fibers. The introduction of the fibers into the openings 26 is facilitated by the presence of the chamfered ends 31. The optical fibers which project beyond the front face of the terminal 2 are then positioned within the V-shaped profiles 19 by means of the bearing member 9. The adhesive is then introduced through the opening 24 formed at the front end and at the top of the cylindrical portion 20, said opening 24 being in communication with the chamber 33. The result thereby achieved is that the adhesive which penetrates into the filling chamber 33 and through the clearance spaces of the openings 26 is capable of maintaining the fibers in position. The choice of the diameter 26 is preferably such as to ensure that the adhesive penetrates by capillarity around the fibers within the openings 26 without, however, flowing out to the exterior. After drying of the adhesive, the fibers are cut, then polished, and the terminal is ready for use.

FIG. 2a is a variant of FIG. 1b, in which the calibrated spacer member 10 is replaced by a cylindrical precision rod 27. This solution is particularly suitable when it is desired to reduce the distance between the axes of the fibers 11. Thus in the case of a distance a of 0.5 mm between the axes of fibers having a diameter of 125 $\mu$m, the nominal diameter of the cylindrical precision rod 27 is 0.39 mm. Within this range of dimensions, it would be rather difficult to produce a calibrated spacer member having the shape of the member 10. As shown in FIG. 2b, a short distance between the axes of the fibers 11 such as a distance of the order of 0.5 mm, for example, makes it possible to pass the fibers through a single opening 28 located on the front face of the terminal 2. In this figured example and as in the previous embodiment, the fibers are introduced through two openings 23 formed at the rear end of the terminal 2.

FIG. 3a illustrates an alternative form of construction which makes it possible to place four optical fibers within a terminal which is preferably provided on its front face with two openings 48 and 49 each adapted to receive one pair of optical fibers 11. It will be understood that this form of construction is equally applicable to the case of a fiber attachment terminal having three or four openings on its front face. A calibrated spacer member of the type designated by the reference 10 and having suitable dimensions receives on each of its first and second V-shaped profiles a calibrated spacer member consisting in this case of a cylindrical precision rod 41. Each cylindrical spacer rod 41 defines V-shaped secondary profiles, each profile being such as to be capable of receiving one optical fiber. The bearing member 9 which rests on the flanks 8 of the V-groove 3 has an underface consisting of three coplanar regions, namely a central region 40 which bears on the two central fibers 11, and two lateral regions 42 which bear on the outer optical fibers 11. By way of alternative, it is possible as in the previous case to leave a small clearance between the regions 40 and 42 and the optical fibers. The regions 40 and 42 are separated by grooves 43 which enable the bearing member 9 to come into contact with the optical fibers 11 without touching the cylindrical spacer rods 41. It will be noted that the optical fibers have been shown in the same plane since this constitutes a preferred arrangement. However, the dimensions of the parts of the assembly can be chosen so as to obtain a different arrangement of the optical fibers within the terminal. Similarly, other forms of calibrated spacer members can be employed.

As shown in FIG. 4, the bearing member 9 is so designed that, if it were to come into abutting contact with the walls 8 of the V-groove 3, the position of the plane 12 would correspond to a theoretical compression of the fibers equal to a few microns at a minimum and to approximately 20 microns at a maximum. In other words, the manufacturing tolerance of the bearing member can permit values which are included within this range, thus avoiding the need for an unduly high degree of accuracy in the production of the bearing member 9. Under these conditions, the bearing member 9 comes into contact with the fibers 11 but its two faces 8' are not abuttingly applied against the faces 8 of the V-groove 3 and the bearing force applied on the fibers 11 is limited by a calibrated pressure system which applies a pressure on the fibers (corresponding in a preferred example of construction to a force of the order of 500 grams at a maximum in the case of a bearing member 9 which is applied on the fibers over a distance of 20 mm) such that the degree of compression of said fibers remains of the order of a few microns with a view to maintaining good accuracy of alignment. The faces 8' of the bearing member 9 remain very close to the faces 8 of the V-groove 3.

In this embodiment, the faces 8 of the bearing member 9 serve to limit any possible tilting of the bearing member 9 under the action of the force F applied along the axis of the groove 3. The tilting movement can also be largely counteracted by providing the top face 15 of the bearing member 9 with a cylindrical profile whose axis coincides with the axis of symmetry of the fibers and by applying the force F by means of a flat portion 50, with the result that the force F is permitted to pass through the mid-plane of the two fibers.

FIG. 5 illustrates the same concept as FIG. 4 but in the case in which four fibers are employed.

The device in accordance with the invention makes it possible to place up to four optical fibers within one terminal of standard size usually employed for centering a single optical fiber. This arrangement is particularly advantageous when considering the fact that V-shaped contours such as those having faces 21 are formed in a fiber terminal with increasing difficulty as the terminal dimensions become greater.

What is claimed is:

1. A device for mounting optical fibers in fiber attachment terminals, said device comprising:
    (a) a base having:
        (i) an abutment surface against which, during use of the device, a surface of fiber attachment terminals is positioned;
        (ii) a first V-shaped groove defined by a linear apex and two planar side walls each of which extends from said abutment surface, said first V-shaped groove terminating at one end in a V-shaped opening in said abutment surface; and
        (iii) first means for positioning fiber attachment terminals in alignment with said linear apex of said V-shaped groove such that, during use of the device, the axis of each fiber attachment terminal being processed is parallel to said linear apex of said first V-shaped groove;
    (b) a first calibrated spacer member received in said first V-shaped groove adjacent said linear apex of said first V-shaped groove and having a face at least approximately coincident with said abutment surface; and
    (c) a bearing member received in said first V-shaped groove outwardly of said first calibrated spacer member and extending toward the apex of said V-shaped groove but not making contact with said first calibrated spacer member, said bearing member having two flat faces extending in parallel to said linear apex of said first V-shaped groove,
    (d) each of said two planar side walls of said first V-shaped groove, the adjacent surface of said first calibrated spacer member, and the adjacent one of said two flat faces of said bearing member defining a cavity sized, shaped, and positioned to receive and position an optical fiber extending from a fiber attachment terminal positioned by said first means such that the optical fiber makes contact with the adjacent one of said two planar side walls of said first V-shaped groove and with the adjacent surface of said first calibrated spacer member.

2. A device as recited in claim 1 wherein said first V-shaped groove is perpendicular to said abutment surface.

3. A device as recited in claim 1 wherein said first means is a second V-shaped groove sized, shaped, and positioned to receive and position a correspondingly shaped portion of a fiber attachment terminal.

4. A device as recited in claim 1 wherein said bearing member is sized and shaped so that, during use of the device, each of said two flat faces on said bearing member makes contact with an optical fiber extending from a fiber attachment terminal positioned by said first means.

5. A device as recited in claim 1 wherein said bearing member is sized and shaped so that, during use of the device, each of said two flat faces on said bearing member does not make contact with an optical fiber extending from a fiber attachment terminal positioned by said first means.

6. A device as recited in claim 1 wherein:
    (a) said first calibrated spacer member has two surfaces which make planar contact with said two planar side walls of said first V-shaped groove and
    (b) the surface of said first calibrated spacer member which defines a portion of each of said cavities is planar.

7. A device as recited in claim 6 wherein said two planar side walls of said first V-shaped groove are perpendicular to each other.

8. A device as recited in claim 1 wherein the surface of said first calibrated spacer member which defines a portion of each of said cavities is planar.

9. A device as recited in claim 1 wherein said first calibrated spacer member is a cylindrical rod.

10. A device as recited in claim 1 wherein said bearing member has two flat side surfaces which makes planar engagement with said two planar side walls of said first V-shaped groove during use of the device.

11. A device as recited in claim 1 wherein said bearing member has two flat side surface which, during use of the device, are at least generally parallel to but do not contact said two planar side walls of said first V-shaped groove.

12. A device for mounting optical fibers in fiber attachment terminals, said device comprising:
 (a) a base having:
  (i) an abutment surface against which, during use of the device, a surface of fiber attachment terminals is positioned;
  (ii) a first V-shaped groove defined by a linear apex and two planar side walls each of which extends from said abutment surface, said first V-shaped groove terminating at one end in a V-shaped opening in said abutment surface; and
  (iii) first means for positioning fiber attachment terminals in alignment with said linear apex of said first V-shaped groove such that, during use of the device, the axis of each fiber attachment terminal being processed is parallel to said linear apex of said first V-shaped groove;
 (b) a first calibrated spacer member received in said first V-shaped groove adjacent said linear apex of said first V-shaped groove and having a face at least approximately coincident with said abutment surface;
 (c) two second calibrated spacer members, each of said second calibrated spacer members being received and positioned between one of said two planar side walls of said first V-shaped groove and an adjacent surface of said first calibrated spacer member, said second calibrated spacer members each having a face at least approximately coincident with said abutment surface; and
 (d) a bearing member received in said first V-shaped groove outwardly of said first and second calibrated spacer members and extending toward the apex of said first V-shaped groove but not making contact with said first and second calibrated spacer members, said bearing member having at least three flat faces extending in parallel to said linear apex of said first V-shaped groove,
 (e) each of said two planar side walls of said first V-shaped groove, the adjacent surface of the adjacent one of said two second calibrated spacer members, and the adjacent one of said at least three flat faces of said bearing member defining a cavity sized, shaped, and positioned to receive and position an optical fiber extending from a fiber attachment terminal positioned by said first means such that the optical fiber makes contact with the adjacent one of said two planar side walls of said first V-shaped groove and with the adjacent surface of the adjacent one of said two second calibrated spacer members, and
 (f) a surface of said first calibrated spacer member, the adjacent surface of the adjacent one of said two second calibrated spacer members, and the adjacent one of said at least three flat faces of said bearing member defining two cavities each one of which is sized, shaped, and positioned to receive and position an optical fiber extending from a fiber attachment terminal positioned by said first means such that the optical fiber makes contact with the surface of said first calibrated spacer member and with the adjacent surface of the adjacent one of said second calibrated spacer members.

13. A device as recited in claim 12 wherein said first V-shaped groove is perpendicular to said abutment surface.

14. A device as recited in claim 12 wherein said first means is a second V-shaped groove sized, shaped, and positioned to receive and position a correspondingly shaped portion of a fiber attachment terminal.

15. A device as recited in claim 12 wherein said bearing member is sized and shaped so that, during use of the device, each of said at least three flat faces on said bearing member makes contact with an optical fiber extending from a fiber attachment terminal positioned by said first means.

16. A device as recited in claim 12 wherein said bearing member is sized and shaped so that, during use of the device, each of said at least three flat faces on said bearing member does not make contact with an optical fiber extending from a fiber attachment terminal positioned by said first means.

17. A device as recited in claim 12 wherein:
 (a) said first calibrated spacer member has two surface which make planar contact with said two planar side walls of said first V-shaped groove and
 (b) the surface of said first calibrated space member which contacts each of said second calibrated spacer members is planar.

18. A device as recited in claim 17 wherein said two planar side walls of said first V-shaped groove are perpendicular to each other.

19. A device as recited in claim 12 wherein the surface of said first calibrated spacer member which contacts each of said second calibrated spacer members is planar.

20. A device as recited in claim 12 wherein said second calibrated spacer members are cylindrical rods.

21. A device as recited in claim 12 wherein said bearing member has two flat side surfaces which makes planar engagement with said two planar side walls of said first V-shaped groove during use of the device.

22. A device as recited in claim 12 wherein said bearing member has two flat side surfaces which, during use of the device, are at least generally parallel to but do not contact said two planar side walls of said first V-shaped groove.

23. A device as recited in claim 12 wherein:
 (a) said bearing member has three flat faces extending in parallel to said linear apex of said first V-shaped groove;
 (b) each of said two planar side walls of said first V-shaped groove, the adjacent surface of the adjacent one of said two calibrated spacer members, and one of the outer two of said three flat faces of said bearing member defines two of said cavities; and
 (c) a surface of said first calibrated spacer member, the adjacent surface of the adjacent one of said two second calibrated spacer members, and the central one of said three flat faces of said bearing member defines two of said cavities.

* * * * *